US005150487A

United States Patent [19]

Hemphill

[11] Patent Number: 5,150,487

[45] Date of Patent: Sep. 29, 1992

[54] EVACUATION RESTRAINT

[75] Inventor: Desmond J. Hemphill, Ballarat1, Australia

[73] Assignee: Hemco Industries Pty. Ltd., Australia

[21] Appl. No.: 835,001

[22] Filed: Feb. 11, 1992

Related U.S. Application Data

[63] Continuation of Ser. No. 603,778, filed as PCT/AU89/00142, Mar. 31, 1989, abandoned.

[30] Foreign Application Priority Data

Mar. 31, 1988 [AU] Australia .............................. P17672

[51] Int. Cl.5 ................................................ A61C 1/00

[52] U.S. Cl. .......................................... 5/625; 5/627; 5/628

[58] Field of Search .................................... 5/625–629; 128/809, 870; 294/140, 151, 152, 165; 206/632, 633, 803

[56] References Cited

U.S. PATENT DOCUMENTS

| | | | |
|---|---|---|---|
| 2,788,530 | 4/1957 | Ferguson | 5/82 R |
| 3,829,914 | 8/1974 | Treat | 5/82 R X |
| 3,986,505 | 10/1976 | Power | 5/82 R X |
| 4,124,908 | 11/1978 | Burns et al. | 5/82 R |
| 4,186,453 | 2/1978 | Burns et al. | 5/82 R |
| 4,209,011 | 6/1980 | Peck et al. | 128/87 R |
| 4,594,999 | 6/1986 | Nesbitt | 128/87 R |
| 4,885,811 | 12/1989 | Hayes | 5/82 R |

FOREIGN PATENT DOCUMENTS

| | | | |
|---|---|---|---|
| 484348 | 7/1977 | Australia | 5/82 R |
| 8909039 | 10/1989 | PCT Int'l Appl. | 5/82 R |

*Primary Examiner*—Michael F. Trettel

*Attorney, Agent, or Firm*—Andrus, Sceales, Starke & Sawall

[57] ABSTRACT

An evacuation restraint comprising a base sheet (1) of flexible fabric, a rigid support member (2) of corrugated plastics board material including a central rectangular portion (3) having its corrugations running longitudinally and smaller rectangular portions (4 and 5) flexibly connected to either end of the central portion (3) having their corrugations running transversely, said support member being secured by sewing or adhesive to said base sheet (1), said base sheet (1) extending beyond the edges of said support member (2) and having longitudinal straps (12 and 13) secured at its edges, bracing straps (17 and 18) extending from the straps (12 and 13) to the ends of the base sheet and transverse straps (20 and 21) having loop connectors (22 and 23) adapted to engage loops (16 and 19) secured to the edges of the base sheet (1) to enable the base sheet to envelope a patient (P) supported by a mattress (M) (FIG. 3) for evacuation purposes.

9 Claims, 6 Drawing Sheets

FIG. 7.
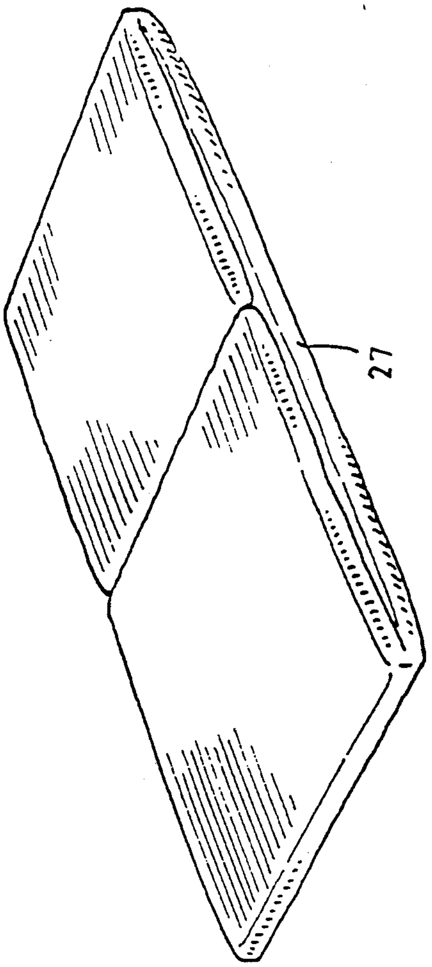
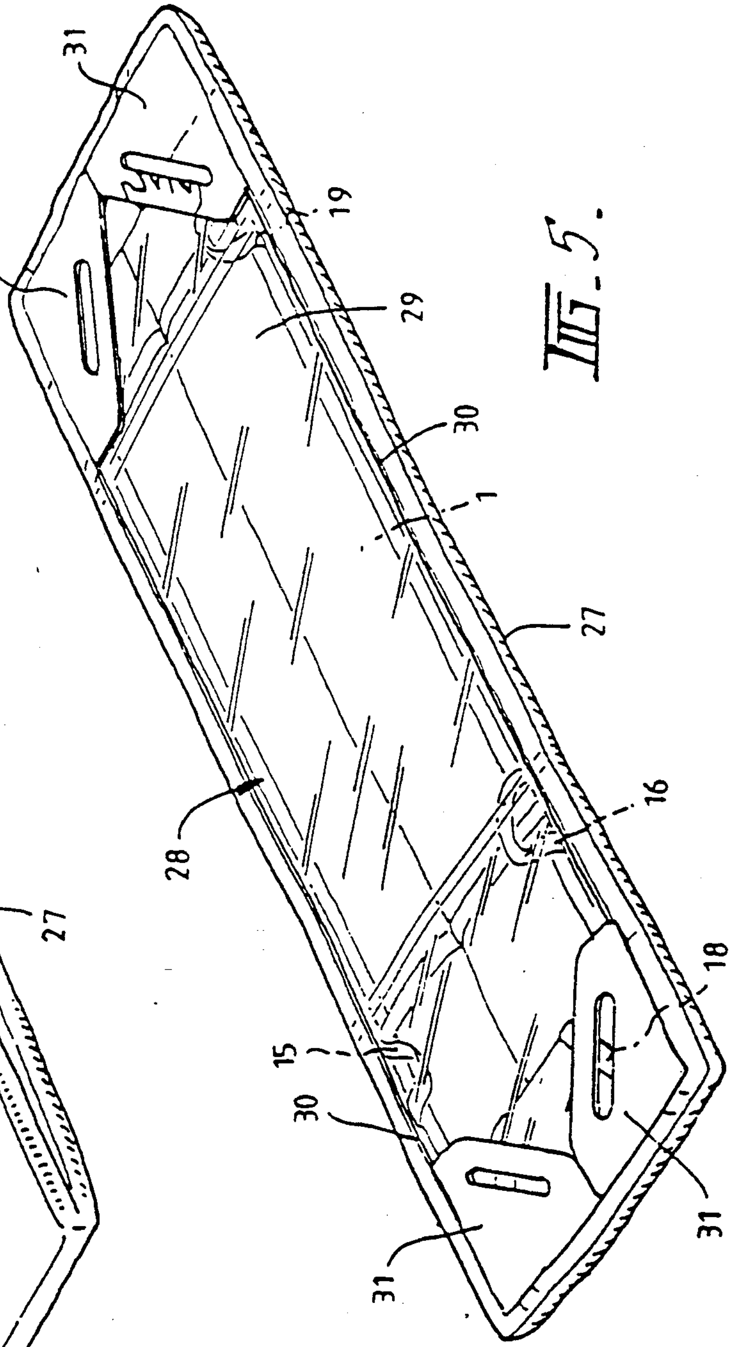
FIG. 5.

EVACUATION RESTRAINT

This is wrapper continuation of application Ser. No. 07/603,778, filed as PCT/AU89/00142, Mar. 31, 1989, now abandoned.

FIELD OF THE INVENTION

This invention relates to improvements in evacuation restraints of the type suitable for positioning under the mattress of a bed in a hospital or other institution housing bed-confined persons.

BACKGROUND OF THE INVENTION

In our Australian Patent No. 536070 (AU-B 62281/80) we have described an improved evacuation restraint which materially improved the securement of bedridden patients for evacuation purposes. In using evacuation restraints embodying the above invention, the mattress supporting a bed-confined patient is utilised to minimise the disturbance of the patient and to protect the patient during the evacuation procedure.

Further consideration of evacuation procedures has shown that it is advantageous to be able to slide the restraint-confined mattress along the floor, over obstacles or down stairs. The restraint described in our earlier patent has been found to be not entirely suitable for that purpose even though it offered a material improvement over the previously known restraints in the manner in which it confined a patient within a mattress.

To protect restraints of the above type against soiling and to enable it to be accessed in a standard manner to minimise delays in the event of an emergency, the restraint is desirably housed in a plastics envelope of the type described in Australian Patent AU-B 34433/78 (U.S. Pat. No. 4,186,453). However, in using packages of this type it has been found that access to the pull handles by means of which the envelope is opened to gain access to the restraint straps requires the mattress to be lifted to an excessive extent whereby the patient may be undesirably disturbed. Furthermore, the package described in the above patent is not entirely convenient to handle during manufacture, marketing and storage prior to use and the cost of manufacture of such packages is relatively high.

SUMMARY OF INVENTION AND OBJECTS

It is an object of the present invention to provide an improved evacuation restraint in which the shortcomings of the prior art restraints discussed above are at least ameliorated. It is the secondary object of the invention to provide a simplified packaging envelope for such evacuation restraints.

Accordingly, the invention provides an evacuation restraint comprising a generally rectangular base sheet (1) of strong flexible material, a generally rectangular support member (2) located centrally of said base sheet (1) and joined thereto on top of said base sheet, said support member being formed of lightweight non-bulky material having greater rigidity than said base sheet being capable of deformation transversely of the support member, said base sheet (1) extending substantially from either side of said support member (2) to enable the base sheet in use to envelop a patient to be evacuated, strap members (12, 13, 14, 17, 18, 20, 21) secured at least to said base sheet (1) and extending from the sides of the base sheet (1), said strap members including means (16, 19, 22, 23) for connecting opposite strap members (12,13) together at at least two longitudinally spaced positions, and strap members (12,13) extending from at least one end of said base sheet (1) by means of which the restraint may be manipulated during evacuation procedures, said support member (2) providing with said base sheet a smooth relatively rigid base on which the restraint may slide during evacuation procedures.

In a preferred form of the invention, the restraint is enclosed within a protective envelope having means for gaining access to said base sheet and said straps. Preferably the protective envelope includes a base portion and a top portion, said top portion having one or more means for enabling removal of the top portion from the base portion. The top portion is preferably made from a suitable transparent plastics material and the means for enabling access comprises a line of weakening formed in said top portion and one or more gripping handles or tabs secured to said top portion by means of which the top portion may be torn open to expose the base sheet and straps.

The support member preferably comprises a sheet of lightweight corrugated board which is most preferably formed from plastics materials. The board is preferably capable of being folded along at least two transverse lines so that the evacuation restraint and protective envelope may be folded into a more convenient size for marketing and storage purposes.

BRIEF DESCRIPTION OF THE DRAWINGS

One presently preferred form of the invention will now be described with reference to the accompanying drawings in which:

FIG. 5 shows the restraint packaged in its envelope;

FIG. 7 shows the packaged restraint in the folded condition.

DESCRIPTION OF PREFERRED EMBODIMENT

Figure 1:
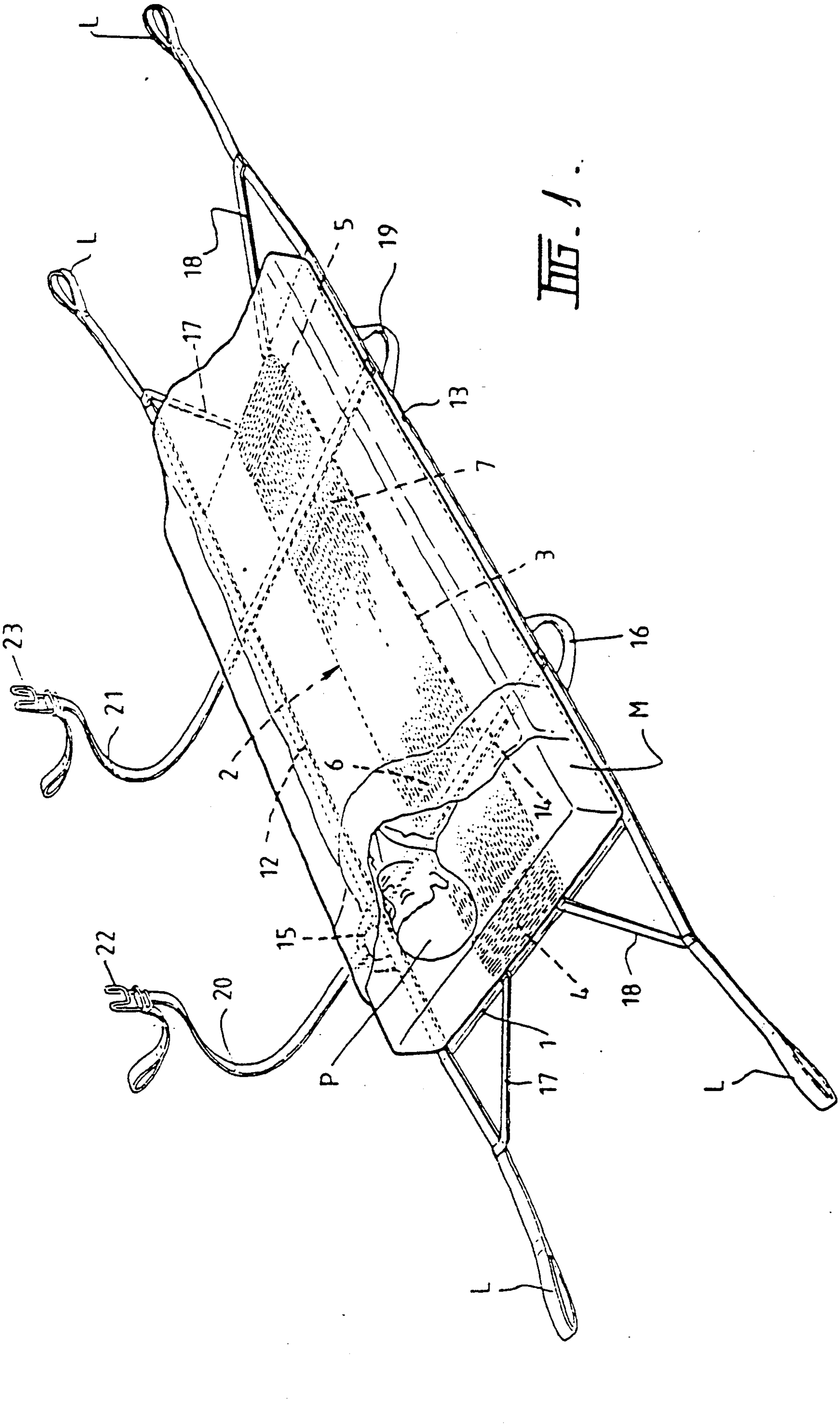
FIG. 1 is a perspective view of the restraint in the unfolded position showing a mattress and patient ready to be enveloped.
Figure 2:
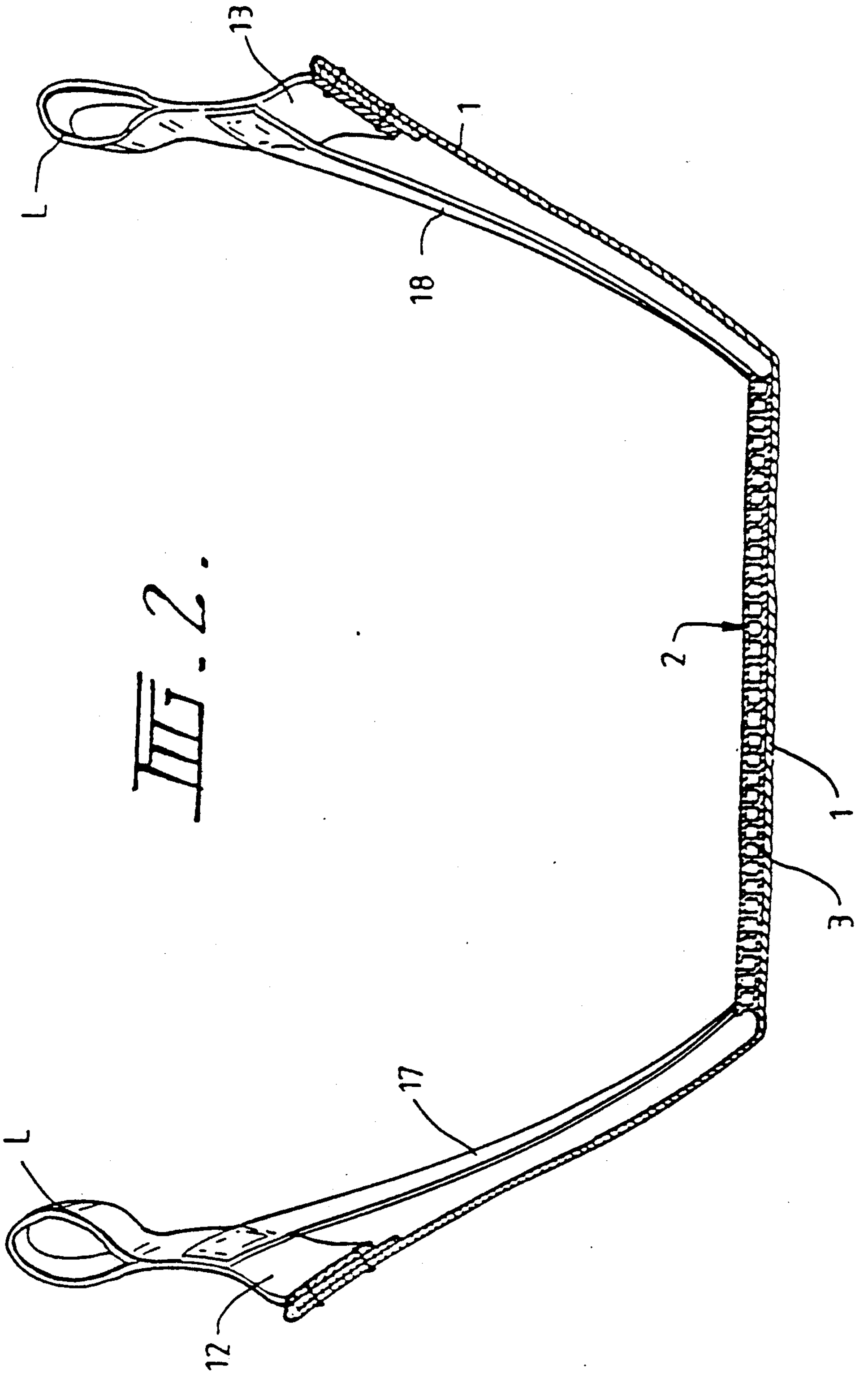
FIG. 2 is a sectional end elevation of the restraint of FIG. 1.

Referring firstly to FIGS. 1 and 2 of the drawings, the restraint embodying the invention will be seen to comprise a generally rectangular base sheet 1 of flexible fabric, such as polyester, which has been treated to be fire resistant, water resistant and relatively friction free, for example by coating or impregnation with Teflon (registered trade mark). A relatively rigid support member 2 is secured centrally to the base sheet 1 by sewing or by adhesive. In the present case, the support member 2 comprises a rectangular sheet 3 of corrugated board formed from plastics material, such as corrugated board sold under the trade mark Corflute, to each end of which small rectangular pieces 4 and 5 are flexibly attached, say by sewing or the like. It will be noted from FIG. 1 that the central rectangular portion 3 has its corrugations running longitudinally while the smaller portions 4 and 5 have its corrugations running transversely. Furthermore, the central portion 3 is formed with fold lines 6 and 7 to enable the end portions of 3 and the smaller portions 4 and 5 to be folded inwardly on to the most central portion of 3.

Referring still to FIG. 1 of the drawings, webbing straps 12 and 13 are secured by sewing or by adhesive or the like to opposite longitudinal edges of the base sheet 1. The straps 12 and 13 extend beyond the ends of the base sheet 1 and terminate in loops L by means of which the restraint may be handled during an emergency. Strap portions 17, 18 extend from a point of attachment to each strap 12, 13 a short distance (e.g. about 6 cm) from the ends of the sheet 1 to a point of attachment to the end of the sheet 1 at the edge of each smaller portion 4 and 5 by sewing, adhesive or the like. A further length of webbing strap extends transversely across the base sheet 1 at 14 and is formed in small loops 15 and 16 extending from either edge of the base sheet where they are secured by sewing to the side straps 12 and 13. A still further length of webbing 21 extends transversly across the sheet 1 near its lower end and is attached to the side straps 12 and 13. The webbing 21 defines a loop 19 at the right hand side of the sheet 1 and has a wire loop connector 23 of known construction secured thereto at the other end. A further strap 20 is attached to the loop 15 and has a similar adjustable wire loop connector 22 attached thereto. The connectors 22 and 23 are adapted to engage the loops 16 and 19 respectively, as shown most clearly in FIG. 3 of the drawings, to cause a mattress and patient supported on the restraint to be enveloped for evacuation purposes.

Figure 3:
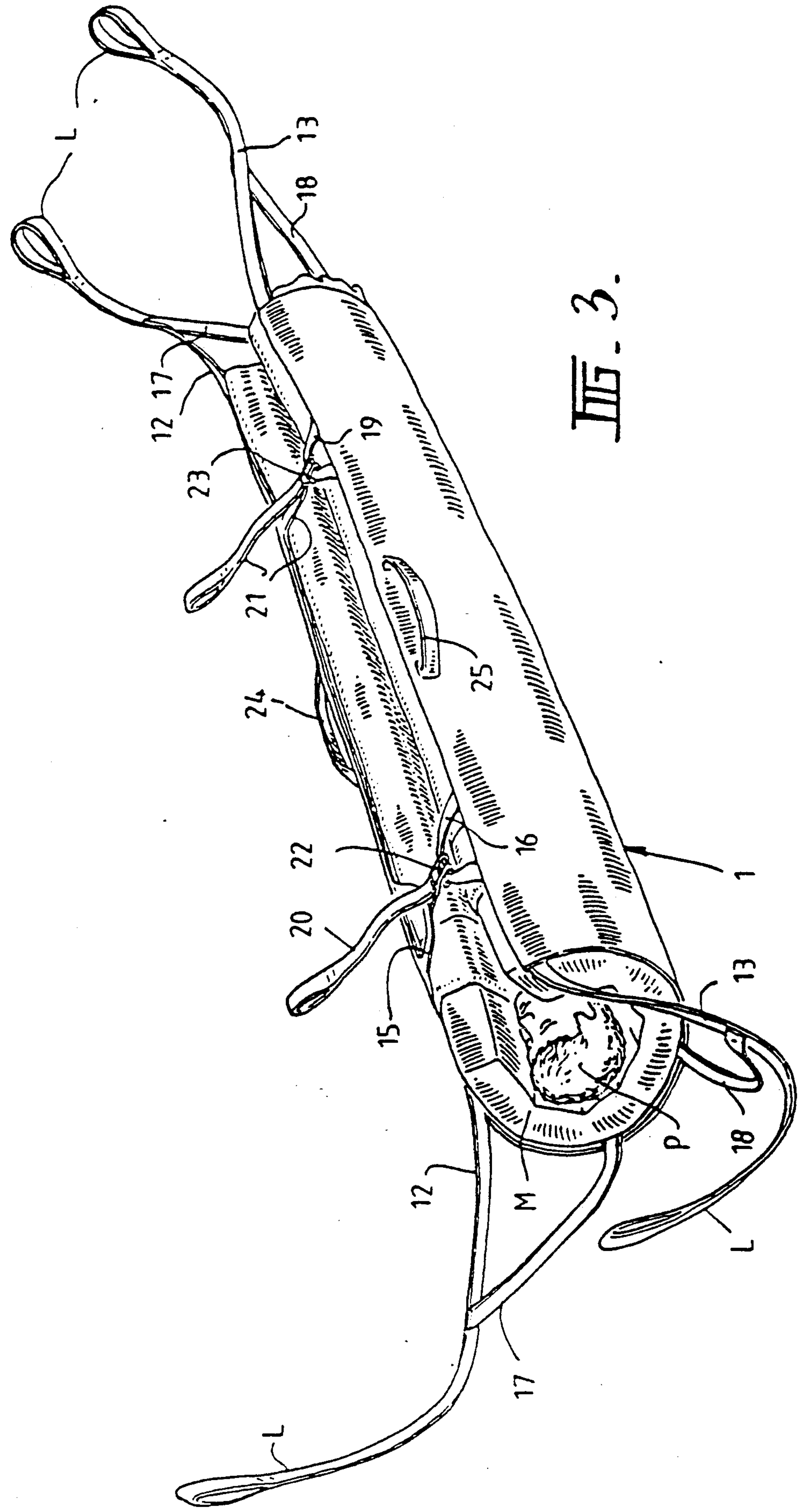
FIG. 3 shows the restraint in use.
Figure 4:
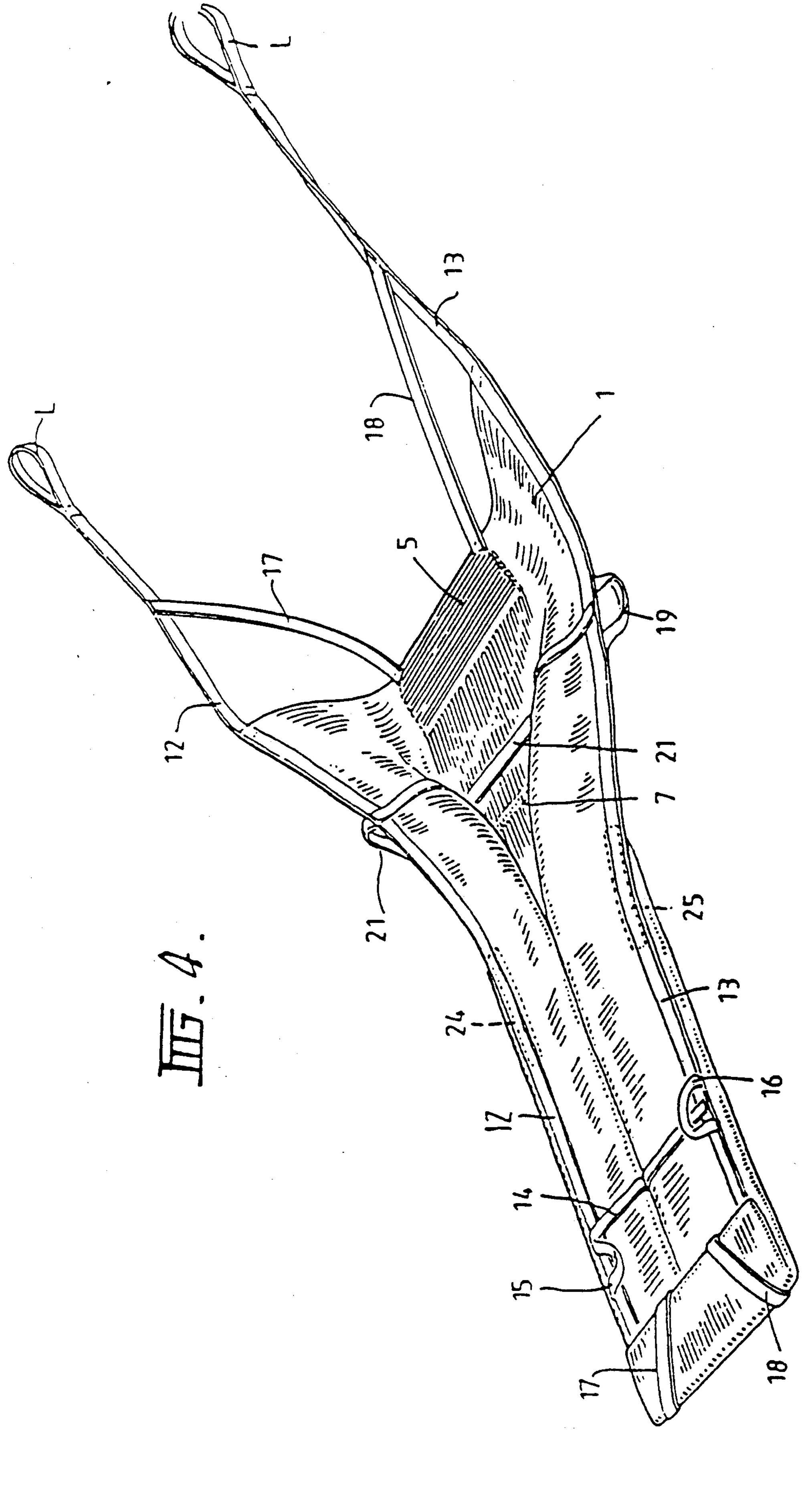
FIG. 4 shows the restraint partly folded ready for packaging.

To enable the restraint to be conveniently stored in a protective package, the side portions of the base sheet 1 and the restraint straps 12, 13, 14 and 21 are folded inwardly to the centre of the support member 2 and are then folded back on top of the inwardly folded portions. The end portions, including portions 4 and 5, are folded inwardly over the folded portions and the end portions of the straps 12 and 13 are tucked under the folded end portions so that the loops L are exposed at the ends of the folded restraint. The folding of the restraint is shown most clearly in FIG. 4 of the drawings. The restraint is then ready to be packaged in its protective envelope, as further described below. To enable the side portions of the base sheet to be readily unfolded, additional gripping loops 24 and 25 are secured centrally to the underside of each edge of the base sheet 1, as shown in FIGS. 3 and 4 of the drawings. These loops 24 and 25 also assist in the evacuation procedures since the restraint may be centrally gripped thereby.

Figure 6:
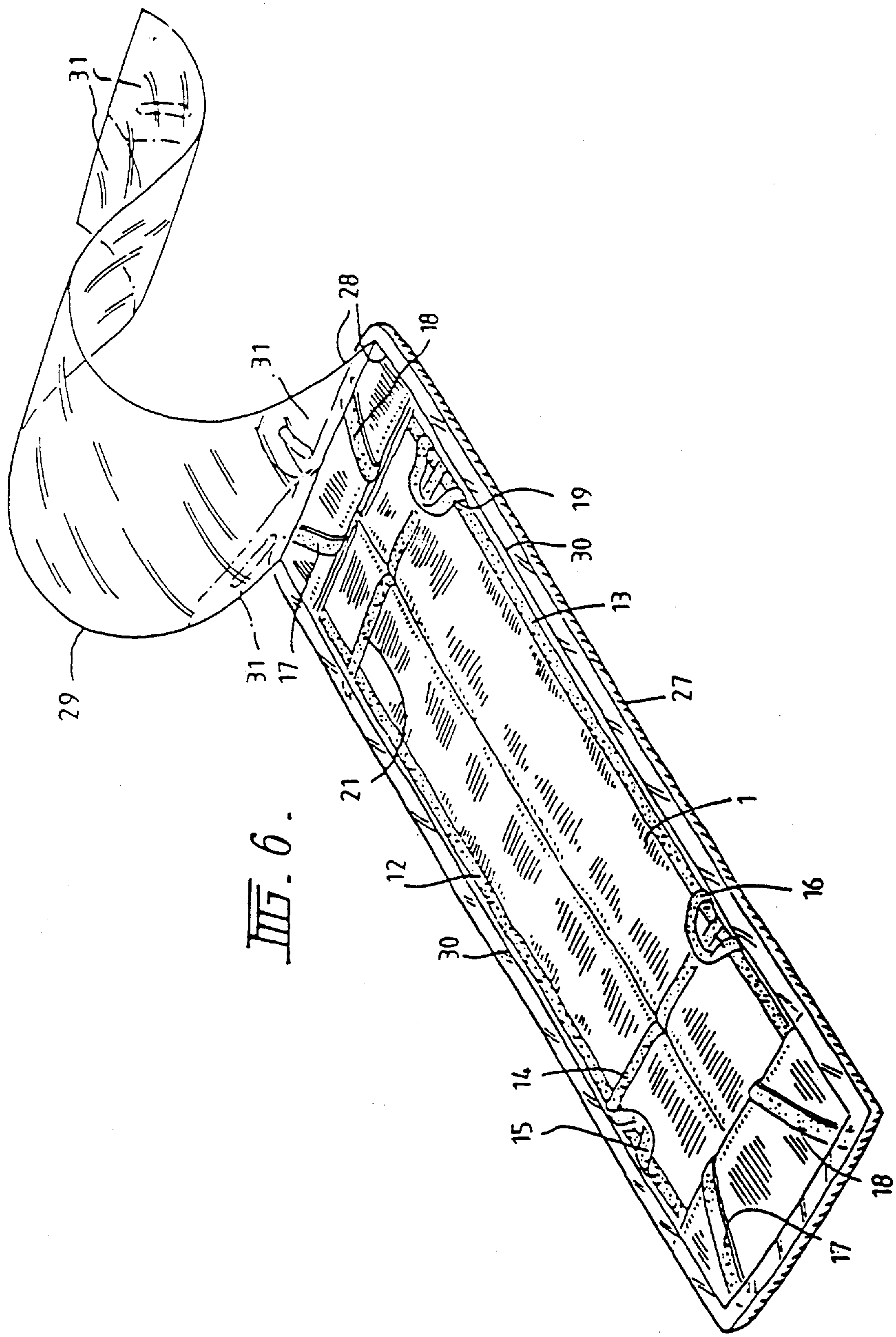
FIG. 6 is a perspective view of the restraint partly opened.

Referring now to FIGS. 5, 6 and 7 of the drawings, the protective envelope for the restraint will be seen to comprise a base portion 27 of suitable plastics material which is either treated with a material which causes the material to be slightly sticky, or "non-slip" in character, or is made from a "non-slip" plastic to retain its position under a mattress in use and so that the base portion 27 tends to stay in position as the restraint is removed therefrom. A clear plastics top portion 28 is secured by heat sealing around the periphery of the bottom portion 27 and a central panel 29 of the top portion 28 is removable by tearing along a weakening line 30 formed during the heat sealing process. To assist in the removal of the panel 29, handles 31 are heat welded to each corner of the panel 29 at either end, for example, as shown in FIG. 5 of the drawings. For instructional purposes, one or more of the handles 31 may be printed with a replica of a hand to show how the handles are to be gripped when the panel is to be removed. Each handle is secured along a substantial portion of each corner of the panel 29 to ensure that the panel will tear away along the line 30 when the handles 31 are pulled.

For transport and storage purposes, the package restraint is able to be folded along the lines 6 and 7 to a more convenient size as shown in FIG. 7 of the drawings.

In use, the packaged restraint is stored centrally under the mattress M supporting a bed-confined patient P. In the event of an emergency, the operator performing the evacuation reaches under the mattress and grips one or more of the handles 31 to tear the panel 29 from the protective envelope along the weakening line 30. The loops L at the ends are pulled and the diagonal portions 17, 18 assist in unfolding the portions 4 and 5 and the attached portions of the sheet 1. As shown in FIG. 6, access is thereby gained to the handle 25 and the folded edges of the base sheet 1 may be moved by pulling the handles 24 and 25 sideways thereby giving access to the loops 16 and 19 and the straps 20 and 21. The connectors 22 and 23 are then engaged with the loops 16 and 19 and the lengths of the straps 20 and 21 adjusted to bring the mattress M into an enveloping relationship with the patient P, as shown in FIG. 3 of the drawings. The patient P may then be evacuated by means of the loops L, 24 and 25.

Since the support member 2 provides a relatively rigid flat surface covered by the base sheet 1, the restraint is able to slide over floors, stairs or obstructions, assisted by the low-friction coating on the base sheet 1. Furthermore, since the base sheet 1 almost encloses the mattress M and patient P, additional protection is provided in the event that fire or water are encountered. Thus, the restraint embodying the present invention provides a significant advance over the prior art restraints and provides even further advantages when contained in the improved protective envelope described above.

I claim:

1. An evacuation restraint comprising a substantially rectangular base sheet (1) of strong flexible material, a substantially rectangular support member (2) located centrally of said base sheet (1) and joined thereto on top of said base sheet, said support member being formed of a continous sheet of lightweight non-bulky material having greater rigidity than said base sheet and being capable of deformation transversely of the support member and being substantially equally rigid across its full width, said base sheet (1) extending substantially from either side of said support member (2) to enable the base sheet and support member in use to be flexed together and to uniformly envelop a patient to be evacuated, strap members (12,13,14,17,18,20,21) secured at least to said base sheet (1) and extending from the sides of the base sheet (1), said strap members including means (16,19,22,23) for connecting opposite strap members (12,13) together at at least two longitudinally spaced positions, and further strap members (12,13) extending from at least one end of said base sheet (1) by means of which the restraint can be manipulated during evacuation procedures, said support member (2) having substantially greater rigidity in the longitudinal direction than the transverse direction and providing with said base sheet a smooth relatively rigid base on which the restraint can slide during evacuation procedures.

2. The restraint of claim 1, wherein said support member (2) comprises a sheet of lightweight corrugated board (3) the corrugations of which extend longitudinally of the restraint.

3. The restraint of claim 2, wherein said corrugated board (3) is formed from plastics material.

4. The restraint of claim 2 or 3, wherein said support member (2) comprises a central portion (3) and separate rectangular portions (4,5) flexibly attached to said central portion (3) at either end thereof.

5. The restraint of claim 4 wherein the corrugations of said separate rectangular portions (4,5) extend at right angles to the corrugations in said central portion (3).

6. The restraint of claim 1 or 2, wherein said further strap members include two straps (12,13) extending longitudinally of said base sheet (1) and attached thereto adjacent each longitudinal edge thereof, each strap being formed into a hand loop (L) at at least one end, bracing straps (17,18) extending between said straps at a position spaced from each end of said base sheet (1) to said base sheet (1) and/or said support member (2).

7. The restraint of claim 1 or 2, further comprising a protective envelope (27,28) enclosing said restraint and having means (30,31) for gaining access to said base sheet (1) and said strap members.

8. The restraint of claim 7, wherein said envelope includes a base portion (27) and a top portion (28), said top portion (28) having one or more means for enabling removal of said top portion (27) from said base portion (28).

9. The restraint of claim 8, wherein said top portion (27) is made from a transparent plastics material and the means for gaining access comprises a line of weakening (30) formed in said top portion (27) and the means for enabling removal comprises one or more gripping handles (31) or tabs secured to said top portion (27) by means of which the top portion (27) can be torn open to expose the base sheet (1) and said strap means.

* * * * *